Patented Oct. 5, 1943

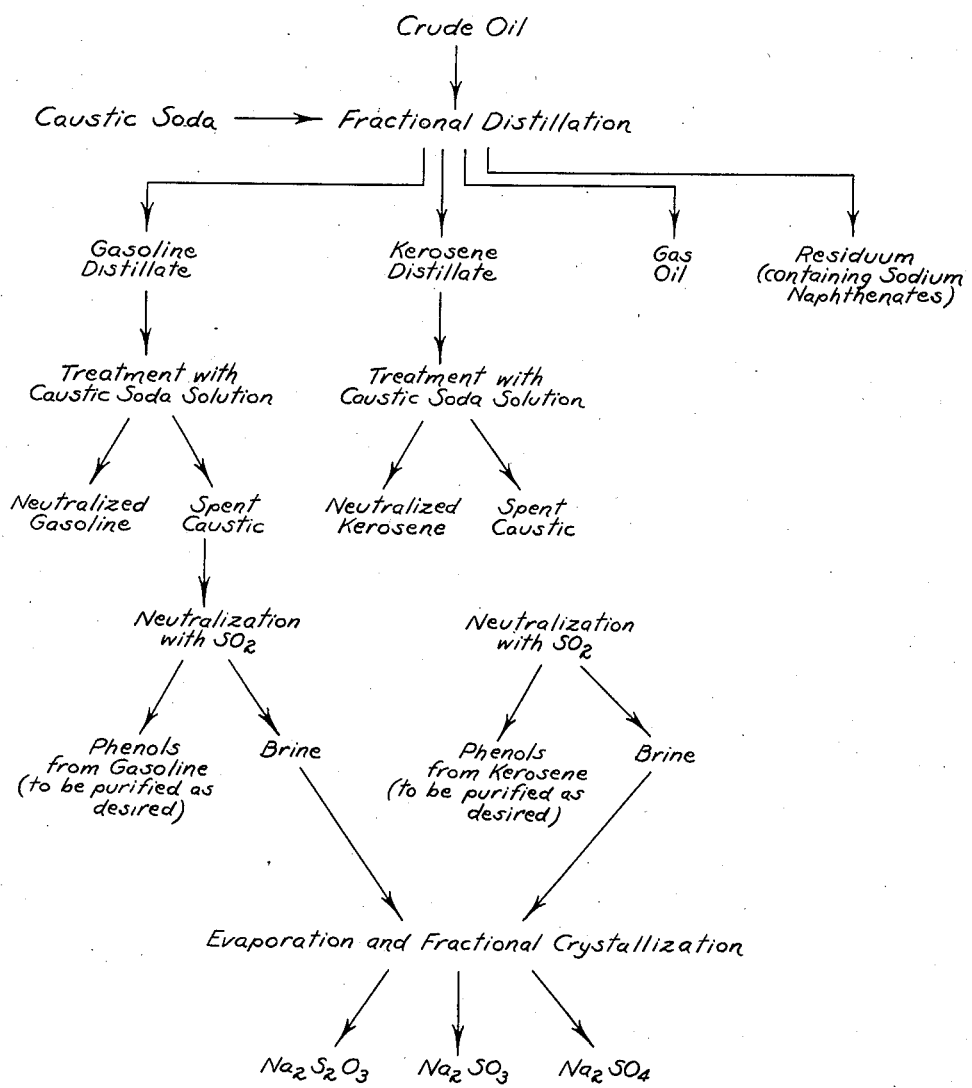

2,331,034

UNITED STATES PATENT OFFICE 2,331,034

RECOVERY OF PHENOLIC COMPOUNDS FROM PETROLEUM

Arthur Lazar, Berkeley, and Thomas F. McCormick, Piedmont, Calif., assignors to Tide Water Associated Oil Company, San Francisco, Calif., a corporation of Delaware Application October 3, 1940, Serial No. 359,528

3 Claims. (Cl. 260—627)

This invention relates to the recovery of phenolic compounds from petroleum, and more particularly from petroleum containing other acidic bodies such as sulphur compounds and naphthenic acids.

While crude petroleum of any origin contains small quantities of impurities of non-hydrocarbon nature, certain types are particularly noted for their relatively high content of such materials. Crude petroleum of California origin is especially rich in non-hydrocarbons comprising sulfur compounds, nitrogen bases, and organic acids. Petroleum of other origin may contain sufficient of these non-hydrocarbons to be applicable to the purposes of this invention.

Phenolic bodies and naphthenic acids are the two principal types of acidic compounds found in crude petroleum of California origin and its distillates. The phenols may be represented by the general formula R·OH, wherein R represents a hydrocarbon radical containing an aromatic nucleus to which the OH group is directly attached. These phenolic bodies are similar to those found in coal tar distillates, namely phenol and its homologues. The naphthenic acids may be represented by the general formula R·COOH, wherein R may represent a great variety of cyclic structures, the nuclei of which may be a five membered (I) or a six membered (II) system of carbon atoms, or a condensed system of a five membered and a six membered ring (III), or of several six membered rings (IV). The carboxyl group as a rule is not directly attached to the ring, as shown in symbols I to IV, but is linked by a carbon chain as illustrated in V:

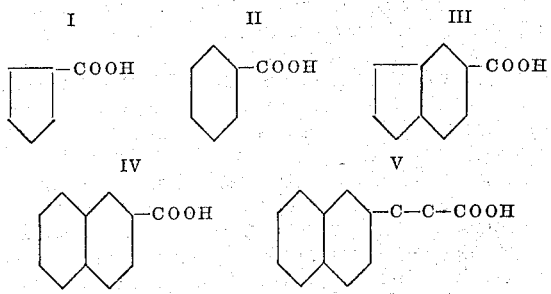

The acidic character of the phenols is due to the hydroxyl group, OH, that of the naphthenic acids to the carboxyl group, COOH, which results in a greater acidic strength of the latter.

The phenolic compounds which are similar in composition to the creosotes obtained from coal tar distillates are useful products which find extensive application in the preservation of wood, as froth flotation agents in the mining industry, and as raw materials in the manufacture of synthetic resins. When obtained in the usual course of refinery operations, particularly during the refining of California oils with caustic soda, they contain substantial portions of naphthenic acids, because caustic soda as a strong alkali combines readily with both types. While the naphthenic acids are also valuable products in themselves, their presence in the phenols or creosote oils impairs the effectiveness of the latter products in their various applications.

The principal object of this invention is to recover phenols, or creosote oils, free from naphthenic acids from petroleum containing both phenols and naphthenic acids.

Another object is the recovery of phenols from spent alkali derived from the neutralization of gasoline or kerosene fractions of petroleum without the liberation of hydrogen sulphide dissolved in such alkali.

Another object is the recovery of phenols from spent alkali derived from neutralizing gasoline or kerosene fractions by the use of a reagent which will produce valuable inorganic by-products.

Other objects will be apparent from the following description.

The invention may be more readily understood by reference to the accompanying drawing, the single figure of which illustrates the separation of phenols and naphthenic acids during the distallation of crude petroleum containing the same, and the subsequent recovery of the phenols. The separation of the phenols from naphthenic acids according to the invention is based on the difference in acidic strength of the two classes of compounds. Caustic soda is introduced by direct injection into the crude oil charge in the form of a concentrated aqueous solution or by feeding caustic soda solution into the reflux of the fractionating tower. The latter method provides countercurrent contacting between the caustic and the oil vapors, whereby the naphthenic acids present in the vapors are absorbed and carried down into the residuum in form of heat stable soda soaps. The phenols, also called creosotes, however, are not absorbed because the temperature maintained in such fractionating towers is well above the dissociation temperatures of their soda salts. Thus in this step of the process the naphthenic acids are separated from the phenols. The general range of temperatures in which this selective separation takes place is above the dissociation temperature of the alkali phenolates but below the dissociation temperature of the naphthenic soaps, the most effective range being between about 300° to 600° F. By injecting the caustic soda into the fractionating tower where such temperatures prevail this separation can be made with remarkable accuracy, providing that the proportions of caustic soda solution added are properly adapted to the naphthenic acid content of the crude petroleum.

Recovery of the nephthenic acids from the residuum requires special extraction methods, which will not be discussed further, being outside of the scope of this invention.

The gasoline and kerosene streams from the fractionating tower containing the creosotes and also some H₂S originating from heat decomposition of sulfur compounds, but substantially free of naphthenic acids, are then subjected to neutralization with caustic soda. For this purpose caustic soda solution may conveniently be injected into the streams as they leave the fractionating tower or condensers thereby providing proper contact between the caustic soda and distillate during the passage of the latter through the run-down lines and receiving tank. Obviously other methods of contacting the distillate with caustic soda may be employed, such as mechanical mixers, etc. Likewise, other alkalis, such as caustic potash solution, may be substituted for the caustic soda, as is well known.

Since the treatment of the gasoline and kerosene fractions is identical, for convenience only the treatment of the gasoline fraction will be described in detail. The products of the gasoline neutralization are neutralized gasoline and spent caustic solution. The spent caustic solution contains the sodium salts of the creosotes as well as substantial quantities of sodium sulphide and polysulphides. Besides these, there is usually some free sodium hydroxide present since the caustic solution is often withdrawn before being completely spent.

The second step of the process is the recovery of the phenolic bodies from the spent caustic solution. This is accomplished by neutralizing the spent caustic solution with sulphur dioxide, which may be introduced into the solution in any convenient manner, such as for example, bubbling SO₂ gas through the solution until neutralized, absorbing SO₂ gas into the solution in an absorption tower, or mixing liquid sulphur dioxide with the solution in proper amounts. Although the phenols obviously can be set free from the caustic solution by the conventional neutralization with sulphuric acid, this method has several inherent disadvantages. First, the sulphuric acid would cause decomposition of the sodium sulphide and polysulphides and release H₂S and free sulphur. The poisonous nature of H₂S would require special precautions in handling, whereas the formation of free sulphur, a product of very low commercial value, is a nuisance. Furthermore, the sodium sulphate formed is of comparatively low commercial value.

This brings out another object of the invention, namely the recovery of valuable inorganic salts from the spent caustic solution. The sodium sulphide and polysulphides in the spent caustic react with SO₂ with the formation of sodium thiosulphate and/or other sodium salts whereby the liberation of toxic H₂S vapors is entirely eliminated. The chemical reactions involved in the formation of the thiosulphate are not completely understood. It is thought that the SO₂ reacts directly with partially oxidized sulphides to form the thiosulphate. Sodium sulphite is also formed by the reaction between the SO₂ and the free caustic soda. In order to recover these salts, the SO₂ neutralized spent caustic is evaporated to dryness. This operation is best accomplished under reduced pressure to minimize the effect of atmospheric oxygen upon the salts, particularly on the sodium sulphite which in aqueous solution is readily oxidized to sodium sulphate. The final separation of sodium sulphite and thiosulphate and their complete purification can be readily accomplished by recrystallization. The difference in water solubility of the three salts, sodium sulphate (as Glauber's salt $$Na_2SO_4 \cdot 10H_2O)$$

sodium sulphite, and sodium thiosulphate is quite appreciable to permit effective separation in this manner.

All of these salts are useful in a number of industries. For instance, sodium thiosulphate is extensively used as an antichlor for removing the last traces of chlorine from bleached fabrics, in photography, and in metallurgy. Sodium sulphite is used as a gentle bleaching agent for silk and wool, in the manufacture of cellulose and paper from wood, as a preservative, antiseptic, and in general as a reducing agent in the various chemical industries.

The creosotes separate from the neutralized spent caustic solution as an oily layer above the inorganic salt solution, and are thus obtained in crude form, satisfactory for a number of commercial applications. If required they may be dried by any of the various known means. If desired, they may be purified by redistillation. This may be particularly advantageous, when phenols of various boiling ranges are desired. For many commercial purposes, however, the crude creosotes can be used after merely having been dried by the usual means.

The processing of the spent caustic solution from kerosene treating is entirely similar. The same inorganic chemicals are obtained but the creosote oil will be in a higher boiling range than that derived from the caustic solution used in gasoline treating.

In the above the invention has been described with particular reference to the recovery of phenols from crude, or straight-run petroleum which is the preferred source of phenols. Cracked petroleum distillates, however, often contain appreciable amounts of phenolic compounds, as well as H₂S and carboxylic acids. In the case of cracked distillates the carboxylic acids are chiefly aliphatic acids rather than the naphthenic acids found in crude or straight-run petroleum. These aliphatic acids originate from the pyrolytic breakdown of the naphthenic acids present in the charge to the cracking still. The separation of the phenols from these aliphatic acids and the ultimate recovery of the phenols from such cracked distillates follows the same steps described above in the case of uncracked petroleum. The cracked petroleum is distilled in the presence of alkali which yields a distillate containing phenols but free from aliphatic acids. The phenols are extracted with caustic soda and recovered by neutralizing with sulphur dioxide without the liberation of hydrogen sulphide.

We claim:

1. A process of recovering phenols from petroleum which comprises: heating a petroleum oil containing sulphur compounds, phenols, and carboxylic acids while in the presence of a caustic alkali to a temperature at which a fraction lighter than gas oil and containing phenols and sulphur compounds is vaporized while said carboxylic acids are converted into alkali metal soaps stable at such temperature, separately condensing said fraction and contacting the same with solution of further caustic alkali to absorb said phenols and sulphur compounds, removing said contacted solution from said fraction, neutralizing the thus removed solution with sulphur dioxide to release the phenols, and separating the released phenols from the remaining sulphur salts.

2. A process of recovering phenols from petroleum which comprises: heating a petroleum oil containing sulphur compounds, phenols, and carboxylic acids to a temperature sufficient to vaporize a portion thereof containing hydrocarbons lighter than gas oil, sulphur compounds, phenols, and carboxylic acids; contacting the vaporized portion with a caustic alkali solution while at a temperature above the dissociation temperature of alkali metal phenolates and below the dissociation temperature of alkali metal soaps of said carboxylic acids thereby converting the vaporized carboxylic acids into alkali metal soaps stable at such temperature; condensing from said vaporized portion a fraction lighter than gas oil and containing phenols and sulphur compounds, contacting said fraction with further caustic alkali solution to absorb said phenols and sulphur compounds; removing the contacted solution from said fraction; neutralizing the thus removed solution with sulphur dioxide to release the phenols; and separating the released phenols from the neutralized solution.

3. In a process of recovering phenols and alkali metal sulphur salts from petroleum in which the petroleum is freed from carboxylic acids and then treated with an alkali solution to form alkali metal phenolates and sulphides in said solution, and the phenols are then recovered separately from said sulphides, that step which comprises: neutralizing said solution, free of carboxylic acid soaps and containing alkali metal phenolates and sulphides, with $SO_2$ to liberate phenols without decomposition of said sulphides in a direction to free $H_2S$.

ARTHUR LAZAR.
THOMAS F. McCORMICK.